Nov. 30, 1943.   D. H. MONTGOMERY   2,335,570
TOOL
Filed March 14, 1941
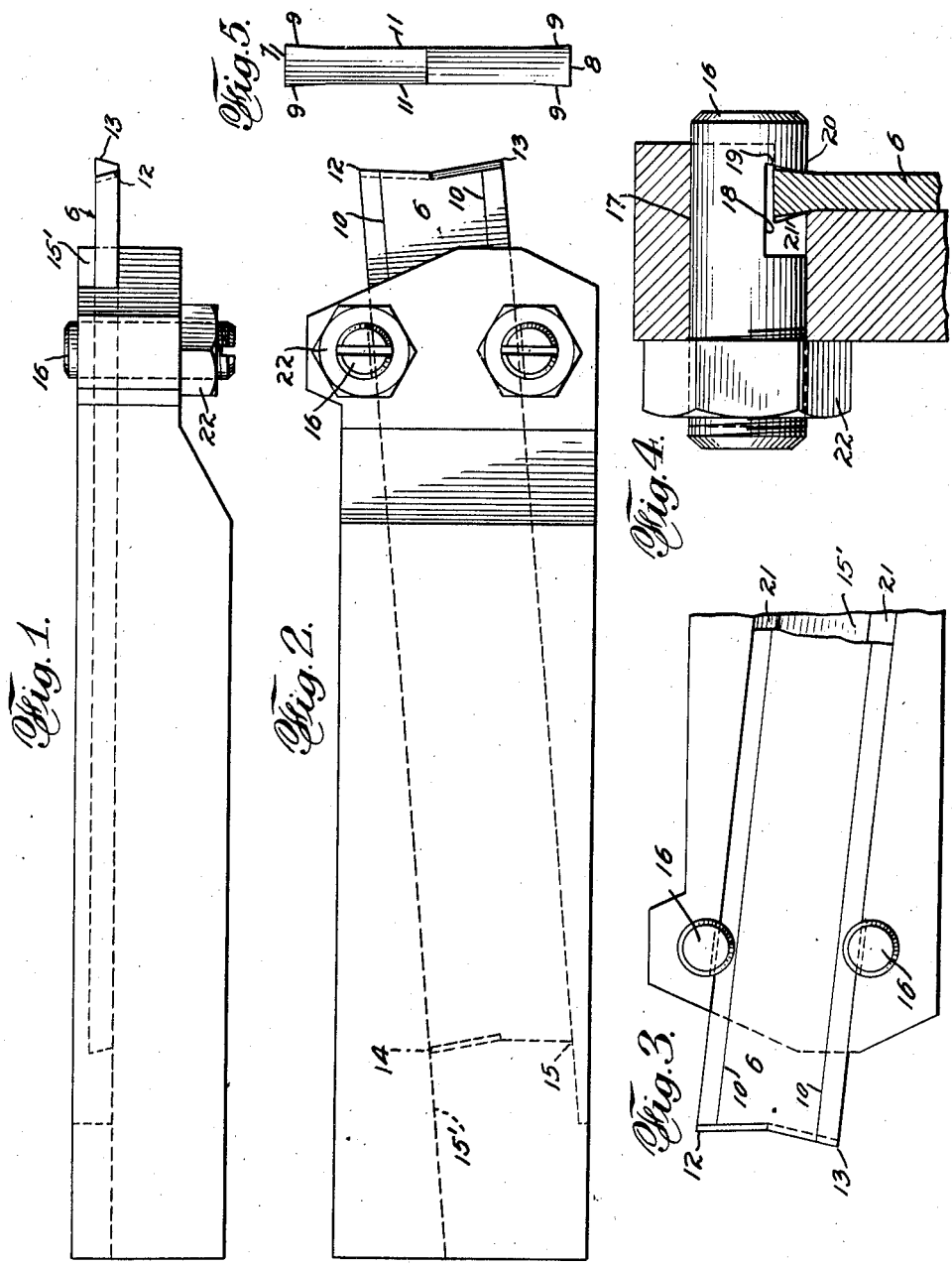
INVENTOR
DONALD H. MONTGOMERY
BY
ATTORNEYS.

Patented Nov. 30, 1943

2,335,570

UNITED STATES PATENT OFFICE 2,335,570

TOOL

Donald H. Montgomery, West Hartford, Conn., assignor to The New Britain Machine Company, New Britain, Conn., a corporation of Connecticut Application March 14, 1941, Serial No. 383,321

1 Claim. (Cl. 29—95)

My invention relates to a tool for lathes and the like.

It is an object of the invention to provide an improved form of tool blade.

It is a more specific object to provide a symmetrical tool blade providing for the maximum number of interchangeable cutting edges.

It is another object to provide an improved tool blade of maximum strength properly relieved so as to clear the work.

Another object is to provide an improved form of tool holder.

Other objects and features of the invention will be pointed out or will become apparent.

In the drawing which shows, for illustrative purposes only, a preferred form of the invention—

Fig. 1 is a top plan view of a tool and holder illustrating features of the invention;

Fig. 2 is a view in side elevation of the parts shown in Fig. 1;

Fig. 3 is a fragmentary view similar to Fig. 2 but viewed from the opposite side;

Fig. 4 is an enlarged fragmentary sectional view taken substantially in the plane of the bolts of Figs. 1 and 2; and Fig. 5 is an enlarged view of the tool blade in end elevation.

My improved tool blade is particularly, though not exclusively, adapted for use as a cut-off tool. The tool comprises an elongated blade, designated generally 6. In the preferred form the blade 6 is symmetrical in transverse section and is widest at the edges 7 and 8. The tool is relieved at opposite sides adjacent the edges 7 and 8, as is indicated at 9—9. Such relief does not extend to the center of the tool, as would be the case in a hollow ground tool, but, on the contrary, such relief or inwardly tapering section terminates a short distance inwardly from the edge, say along the line 10. The opposite sides 11—11 of the blade inwardly of the relieved sections are preferably parallel to each other and thus a blade having an extremely rigid section is provided.

Since the tool blade is of symmetrical section it may be ground at opposite ends in generally fish-tail form, so as to provide cutting edges 12—13 at one end and duplicate cutting edges 14—15 at the opposite end. When so ground the blade possesses four cutting edges, which may be used one after the other before the blade need be removed for resharpening. The blade should be of a width, that is, of a height as viewed in Figs. 2 and 3, somewhat greater than the radius of the bar to be cut off, in order that the tool will clear the work properly; that is to say, when the cutting edge 12 is being used, the lower side of the bar should be higher than the lower relief line 10 as viewed in Fig. 2. With a blade of the proper height the tool will fully clear the end of the bar and the piece part, since the sides 11—11 of the bar define a narrower section than the cutting edge 7.

My improved tool holder includes means for receiving the tool and securely clamping the same thereon. In the preferred form the tool holder is provided with a slot 15' of a width to properly receive the blade. The blade is clamped in the slot by improved means, preferably in the form of a bolt 16, slidable in a hole 17 through the holder. The bolt is provided with a clamping projection and, in the form shown, such projection is formed by cutting a notch 18 transversely in the bolt, and the hole 17 in the holder intersects the slot 15, whereby a blade passed endwise into the slot will pass through the notch 18 of the bolt. The clamping edge of the notch 18 is preferably under cut, as indicated at 19, so that the blade 6 is engaged inwardly of the edge, as shown at 20. Thus the outer edge of the blade 6 is not forcibly engaged by the clamping surface and is therefore not marred thereby. If desired, the slot 15 in the holder may also be undercut or relieved along the longitudinal sides of the bottom, as shown at 21, so that the side edges of the tool will not be marred. However, it is not so necessary to undercut or relieve the slot, since the blade has a very extended bearing surface in the slot and is not so likely to be marred by the slot as it would be by the side of the slot in the bolt 16. However, one or both of the undercuts 19—21 may be dispensed with and those surfaces made to conform to the shape of the adjacent blade parts so as to fit flat thereon and thus avoid stresses that might otherwise be set up when the bolts are drawn up. The bolt 16 has a nut 22 threaded thereon for drawing the bolt in to clamp the blade in place, as will be clearly understood. In the preferred form two securing bolts are provided, one at each edge of the blade 6, as will be clear from Figs. 2 and 3. These bolts may be and preferably are duplicates of each other and the description already given will suffice for both bolts.

When it is desired to remove the blade or adjust it lengthwise in the holder it is necessary only to back off on the nuts 22, so as to release the blade, after which it may be freely moved longitudinally in the holder or removed entirely therefrom. It will be seen that my improved blade is provided with multiple edges and a cutting edge locating surface. Thus when the blade is replaced it almost automatically assumes the correct position.

The tool herein disclosed, while particularly useful as a cut-off tool, is well adapted for use as a tool slide tool in a combination as set forth more particularly in my application, Serial No. 383,320, filed March 14, 1941, wherein the tool slide tool is designed to cut inside the center line of the spindles of a multiple spindle machine, and is so placed that the major force of the cut is more or less toward the stem carrying the tool slide rather than across it.

While the invention has been described in considerable detail and a preferred form illustrated, it is to be understood that various changes may be made within the scope of the invention as defined in the appended claim.

I claim:

In a tool, an elongated tool blade substantially symmetrical in transverse section, said blade being widest at its edges and relieved inwardly of its edges at opposite sides, said blade having a substantially V-shaped symmetrical slot cut in the end thereof, for the purpose described.

DONALD H. MONTGOMERY.